United States Patent [19]

Bukatarevic

[11] 4,346,303
[45] Aug. 24, 1982

[54] CONTROL SYSTEM FOR AN ELECTRICALLY DRIVEN VEHICLE WITH THREE GENERATORS AND FLYWHEEL ENERGY CONSERVATION

[76] Inventor: Dragan Bukatarevic, 22 Cheniston Gardens, London W.8., England

[21] Appl. No.: 244,277

[22] Filed: Mar. 16, 1981

[30] Foreign Application Priority Data

Mar. 18, 1980 [YU] Yugoslavia .................. 733/80

[51] Int. Cl.³ .................. B60L 11/04; B60L 11/16
[52] U.S. Cl. .................. 290/45; 290/17; 180/65 C
[58] Field of Search .................. 290/9, 17, 45; 180/65 A–65 D

[56] References Cited

U.S. PATENT DOCUMENTS

| | | | |
|---|---|---|---|
| 2,443,770 | 6/1948 | Kasschau | 180/65 C |
| 3,109,972 | 11/1963 | Edwards | 180/65 C |
| 4,109,743 | 8/1978 | Brusaglino et al. | 180/65 C |
| 4,309,620 | 1/1982 | Bock | 290/45 |

Primary Examiner—J. V. Truhe
Assistant Examiner—Shelley Wade
Attorney, Agent, or Firm—Larson and Taylor

[57] ABSTRACT

An energy-conserving control system for an electrically driven vehicle comprises a traction motor (3) converting electricity generated by a first generator (1) into mechanical propulsion, and combined with a second generator into a single induction motor/generator (3) operative during deceleration to convert vehicle kinetic energy into electricity; a second motor (2) to convert electricity into mechanical energy stored in a flywheel, and a third generator operative during subsequent acceleration to convert energy stored in a flywheel into electricity to drive the traction motor (3). The second motor and the third generator are also combined as a single induction motor/generator (2). The respective functions of the various motors and generators during acceleration and deceleration are largely determined by variations in the direction and magnitude of the currents applied to their energizing or field windings.

10 Claims, 11 Drawing Figures

CONTROL SYSTEM FOR AN ELECTRICALLY DRIVEN VEHICLE WITH THREE GENERATORS AND FLYWHEEL ENERGY CONSERVATION

This invention relates to a control system for an electrically driven vehicle. In particular, the invention is concerned with a control system adapted to utilise energy derived from the kinetic energy of the vehicle during deceleration thereof.

It is known that the fuel consumption of motor vehicles is considerably greater when operating in town traffic, on a winding speed or on a road with frequent changes in gradient. This is because the vehicle is subject to frequent braking under these conditions which results in the kinetic energy of the vehicle lost during braking to be irretrievably wasted as heat either generated by the vehicles braking system or by the braking effect of the vehicle engine.

According to the present invention a control system for an electrically driven vehicle comprises a prime mover for driving first generator means, electric traction motor means for converting electrical energy generated by the first generator means into mechanical energy propelling the the vehicle, second generator means operative during deceleration of the vehicle to convert kinetic energy of the vehicle into electrical energy, second motor means for converting electrical energy generated by the second generator means during said deceleration into mechanical energy stored in mechanical energy accumulator means, and third generator means operative during subsequent acceleration of the vehicle to convert mechanical energy stored in the mechanical energy accumulator means into electrical energy for driving the electric traction motor means.

Preferably, the traction motor means and the second generator means comprise a common first induction motor/generator the second motor means and the third generator means comprise a common second induction motor/generator and the first generator means comprises an induction generator.

Thus, in accordance with the invention the braking process is accompanied by the absorption of the kinetic or potential energy of the vehicle which is then used during subsequent acceleration.

In a preferred embodiment of the invention the energising or field windings of the first generator means and the second induction motor/generator are connected to receive a common energising current, and the respective functions thereof during acceleration and braking of the vehicle are determined by varying said energising current, the direction of the said energising current being alternately reversed by successive operations of the acceleration and braking control of the vehicle. Thus the acceleration and braking of the vehicle may be controlled by controlling the direction and magnitude of this energising current, the magnitude of the current in one direction controlling the rate of acceleration, and that in the other direction controlling the rate of deceleration.

The invention may thus be implemented by three rotary induction machines, the first operative only as a generator driven by the prime mover (typically an internal combustion engine), the second and induction motor/generator (i.e. an induction machine capable of functioning as a generator converting mechanical energy into electrical energy and as a motor converting electrical energy into mechanical energy) operative as a motor during acceleration and driven primarily by the output of the first generator, but also by the third induction machine, again in the form of a motor/generator whenever the latter is producing sufficient electrical energy in its generating mode to meet the power requirements of the vehicle. This third machine operates in its motor mode to convert the electrical energy generated by the second machine when operating in its generator mode during deceleration of the vehicle into mechanical energy stored conveniently in a rotating flywheel.

Each of these machines may conveniently be of the same type and in principal any kind of DC motor/generator may be used. Preferably however, they may each comprise a machine of the kind described in my copending UK Patent Application No. 81.00401.

This type of generator is capable of generating greater amounts of energy than alternative forms of generator of the same size and the size and direction of the EMF induced in the induction winding is directly proportional to the strength and direction of the magnetic field produced by the energising or field winding. They are also completely reversible, i.e. they can perform as motors or generators depending on the direction of the current flow through that winding in which the output EMF is induced during operation as a generator.

The invention will now be described in greater detail, by way of example only, with reference to the accompanying drawings of which:

Figure 1:
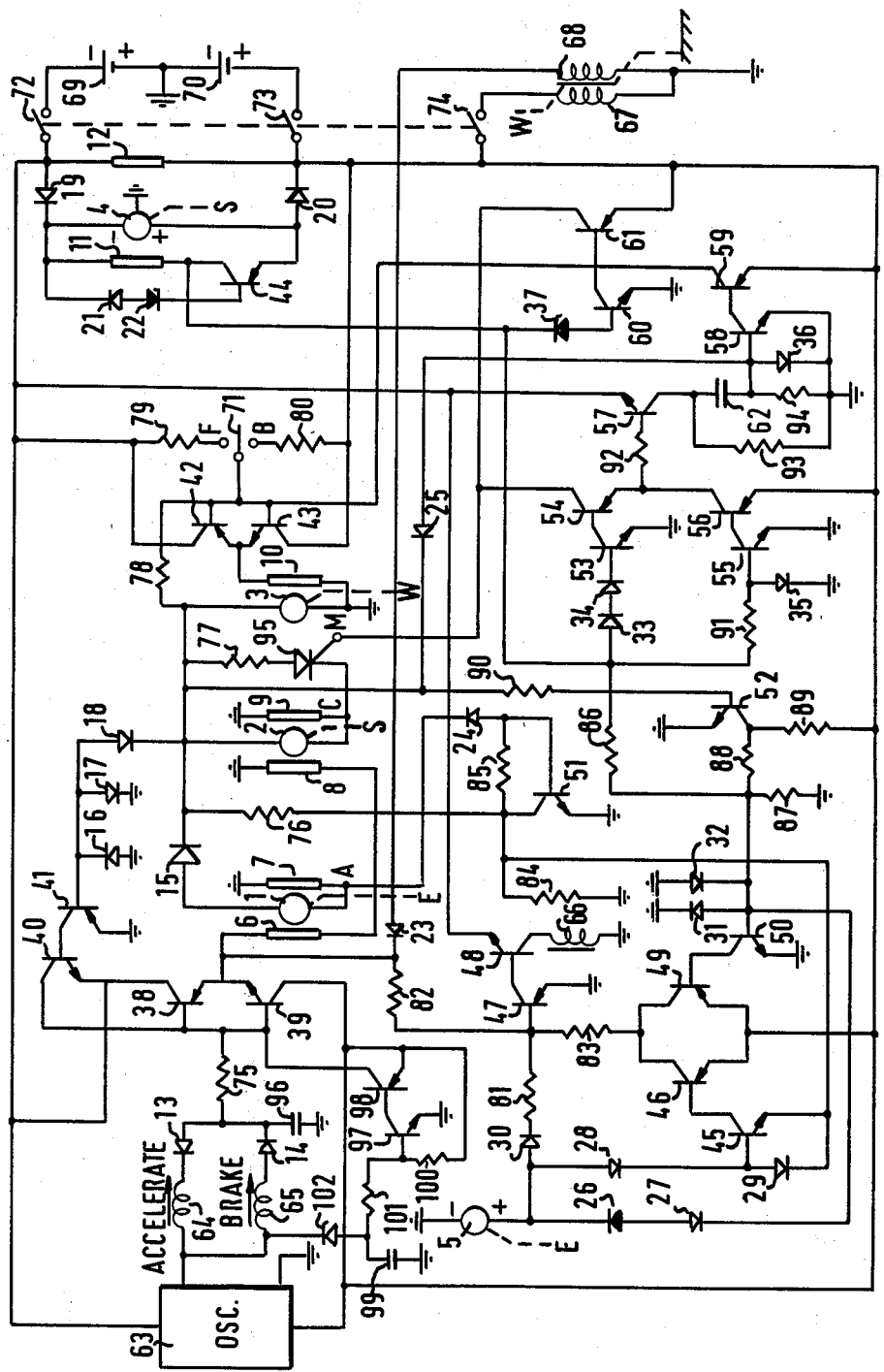
FIG. 1 is a circuit diagram of an electrical vehicle control system in accordance with the present invention.

Referring to FIG. 1, the system includes a DC generator 1 coupled to the drive shaft E of an internal combustion engine (not shown), a DC generator 2 coupled to a freely rotating shaft S to which a further DC generator 4 and an accumulatory flywheel (not shown) are also coupled. A DC motor 3 is coupled to drive the vehicle wheels via shaft W which is also coupled to the vehicle body via an electromagnetic clutch controlled by currents flowing through its windings 67, 68. The clutch becomes engaged whenever the vehicle is stationary or out of use, and the switches 72, 73, 74 are open.

Switches 72, 73 connect a pair of series-connected batteries 69, 70, the joint terminal of which is earthed such that the battery 69 provides a source of negative potential and the battery 70 provides a source of positive potential to the remainder of the system relative to the vehicle body. Switch 74 connects the winding 67 of the clutch to the battery 70 to release the clutch when the switch is closed. The three switches may be operated by turning the ignition key of the vehicle.

The generator 1, unlike the generator 2 and the motor 3, is required only to function as a generator which functioning is achieved by means of a diode 15 and the blocking action of transistor 40, 41, the diode 18 and transistor 39, as explained in greater detail above.

The generator 2 is reversible, being designed to function both as a generator, driven by energy stored in the flywheel to which it is coupled, and as a motor during e.g. deceleration of the vehicle while braking when it drives the flywheel.

The electric motor 3 is also reversible, functioning as a generator during deceleration of the vehicle but otherwise as the traction motor of the vehicle. The induction field energising winding 10 of the motor 3 is fed via transistors 42, 43 from a switch 71 which connects the winding of the negative potential of battery 69 via a resistor 79 when in position F for forward motion, and to the positive potential of battery 70 via resistor 80 when in position B for reverse motion.

Each of the two generators 1, 2 has a respective induction field energising winding 6, 8 connected together in series between an earth terminal and the emitters of transistors 38, 39. The generators 1, 2 each also have a respective protective winding 7, 9 connected between one terminal of the generator's output winding and earth to receive the current generated by the associated generator. The function of the protective windings 7, 9 is to reduce the strength of the magnetic induction field and hence the generated EMF which, in the case of an electrodynamic generator of the present example, is directly proportional to the induction field strength. This protects against overloading and since the windings 7, 9 need have only a few turns and consequently a comparatively low self-induction coefficient, the delay factor is negligibly small.

An oscillator 63, typically operating at a frequency in excess of 20 KHz and producing a sinusoidal output voltage is connected between the positive and negative poles of the feed batteries 69, 70 so that the oscillator 63 will become inoperative when the potential on either pole falls to zero. The output potential of the oscillator 63 is fed via inductivity to diodes 13, 14 which feed a capacitor 96. The cores of the variably inductive windings 64, 65 are coupled respectively to the accelerator and brake controls of the vehicle producing respective positive and negative output potentials from the diodes 13, 14 the magnitudes of which increase with the required rate of acceleration or deceleration, as the case may be. Thus, during acceleration, for example, the core of the winding 64 is drawn out altering the inductivity thereof and creating a negative potential on the capacitor 96 (positive during deceleration) which is fed via a resistor 75 to the base of transistor 38 which becomes conductive to feed the energising windings 6, 8 of the generators 1 and 2 from a source of negative potential. This causes the generators 1, 2 to produce positive output EMF, with respect to junctions A, C. During deceleration, the positive potential produced in capacitor 96 renders transistor 38 conductive to apply a positive feed potential to the energising windings 6, 8 of generators 1, 2 to produce negative output EMFs.

The energising potential applied to the windings 6, 8 of the generators 1, 2 is also fed, via a resistor 82, to the base of transistor 47 and via a diode 23 to the windings 6, 8 of the elctromagnetic clutch. When the energising potential is negative, i.e. during acceleration, the winding 68 is energised via the diode 23 so that the clutch cannot be engaged. A negative energising potential at the base of transistor 47 causes transistor 47 and 48 to conduct, thereby activating a solenoid 66 the core of which is coupled to the throttle of the engine. Such activation causes the core of the solenoid 66 to be drawn in, causing an increase in the speed of the engine related to the magnitude of the negative potential on the base of transistor 47. The potential on the base of the transistor 47 is also dependent upon the positive potential generated by a generator 5 coupled to the engine shaft E to act as a revolution counter, producing an output potential proportional to the speed of the engine. Thus the speed of the engine will increase with the magnitude of the negative energising potential for the generator windings 6, 8 until the positive potential produced by the generator 5 and applied to the base of transistor 47 via diode 30 and resistor 81 reduces the conductivity of transistors 47, 48 hence reducing the engine speed and restoring the balance. During this process the engine speed has a tendency to follow synchronously the said negative energising potential on the emitter connections of transistors 38, 39.

The positive EMF from the generator 5 is also applied, via a diode 28 to the base of a transistor 45, the emitter of which is connected to a voltage distributer comprising resistors 76, 84 and transistor 51. When the EMF generated by the generator 5 reaches the value in the voltage distributer which is related to the output EMF of the generator 1, the transistors 45, 46 become conductive and feed, via resistor 83 a positive potential to the base of transistor 47 reducing its conductivity and consequently limiting the engine speed.

Figure 2:
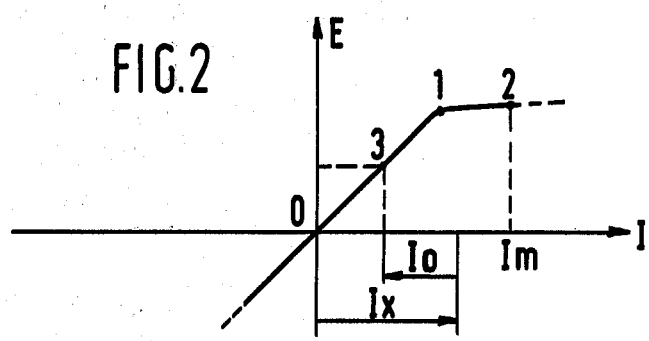
FIGS. 2 to 9 illustrate graphically certain characteristics of the system of FIG. 1 in operation.

Referring now to FIG. 2, a negative energising voltage of current Ix flowing through the energising winding of generator 1 would normally produce an output EMF E which increase linearly with the output current I as represented by the line 0-1 up to a certain maximum value beyond which it remains substantially constant as represented by the line 1-2 owing to saturation of the generator's magnetic induction. The quantities Ix and Io in FIG. 2 represent the opposing effects of energising current Ix and the generator current Io on the magnetic induction and hence the output EMF E and current I of the generator 1. As will be seen, an energising current Ix will normally produce a generator output voltage and current represented by a point just above the knee of the curve, but the effect of the generator current flowing through the protective winding 7 reduces these to the values represented by point 3 on the curve. The maximum generator current Im is determined by the nominal current at the generator's highest loading determining the size of the portion 1-2 in the region of the magnetic induction saturation.

The instant an EMF appears on the generator 1, the generator 2 and the motor 3 are practically short-circuited and the value of the current in generator 1 is approximately equal to the energising current. The generator 2, which is under no load at the time when the first EMF appears on generator 1, functions as an electric motor following the generator 1 on the basis of equal EMFs and rotates the flywheel to which it is coupled. When the electric motor 3 is set in motion by the output of the generator 1, this EMF increases gradually and the generator output current is gradually reduced until a balance is reached between the power produced by the generator 1 and the power received by the motor 3 enabling the vehicle to move at a given speed.

Figure 4:
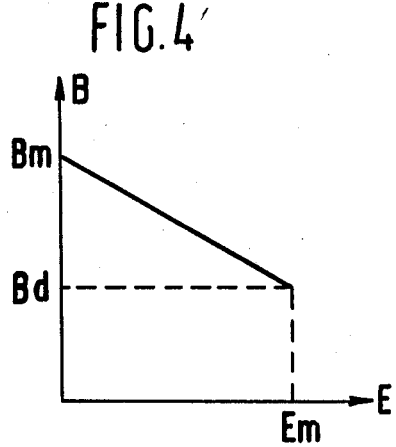
Figure 6:
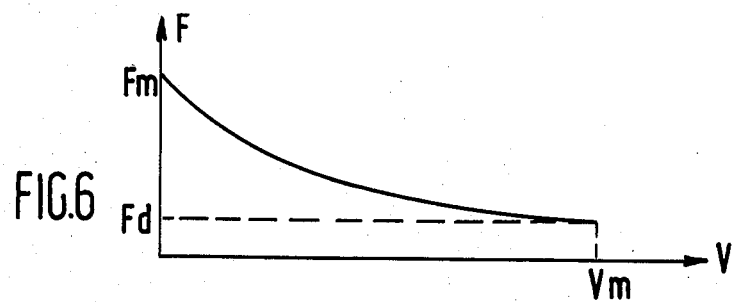

The energising current flowing through the energising winding 10 of the motor 3 is controlled in such a manner that the EMF of the motor lies on the knee of the curve representing the current/voltage characteristics of the motor (by analogy with FIG. 2). When the vehicle moves forward, with the switch 71 in position F, the EMF of the motor reduces, via the resistor 78 and the transistor 42, the energising current flowing through the energising winding 10. This in turn reduces the value of the magnetic induction B of the motor, as illustrated in FIG. 4, so that when the motor EMF reaches its maximum Em the magnetic induction is reduced by a certain amount in relation to its initial value when the motor 3 was first started. The overall transforming ratio of the electric motor's tractive power is determined by the relationship between the maximum and minimum magnetic induction Bm, Bd and the maximum and minimum current generated by the generator 1. FIG. 6 illustrates the relationship between the tractive power F of the motor 3 and vehicle speed.

If the current of the negative energising voltage applied to the windings 6, 8 of the generators 1, 2 is reduced, as a result of retraction of the core of the inductive winding 64, or if it falls off to zero or is replaced by a positive energising current as a result of withdrawal of the core from the inductive winding 65 during braking, then the EMF produced by the generator reduces or changes polarity. The EMF produced by the generator 2 and that of the motor 3 remain the same initially, but will tend to reduce gradually owing to the reducing inertia of the vehicle. As a result this will generally cause the diode 15 to become non-conductive (unless the output EMF of generator 1 is still positive with respect to that associated with the generator 2 and the motor 3) isolating the generator 1 from the generator 2 and motor 3.

Figure 7:
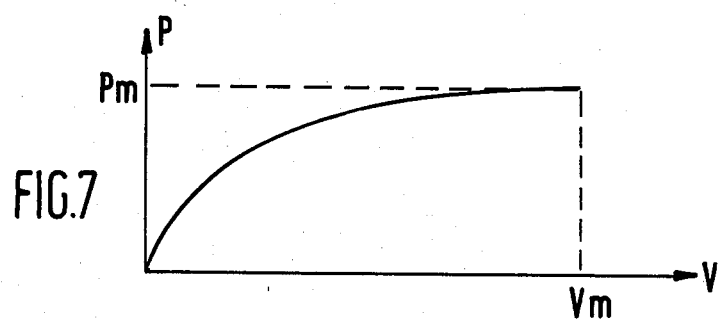

In FIG. 7, Ix and Io represent the effects of the currents flowing through the energising and protective windings 8, 9 of generator 2 during braking. On its own, the positive voltage energising current would produce a negative EMF on the generator 2, but this is compensated by the generator current flowing through the protective winding 9. The EMFs produced by the generator 2 and motor 3 even out and the electric motor 3 functions as a generator, converting the kinetic energy of the decelerating vehicle into electric energy and the generator 2 functions act as a motor converting the electric energy generated by the motor 3 into mechanical energy by increasing the speed of rotation and thus angular momentum of the flywheel.

The generator 2 and motor 3 continue to function in this manner until the EMF reaches zero and the motor 3 and hence the vehicle stops, subject to the limitation of the rotational speed of the flywheel, and generator 2, to a predetermined maximum.

Figure 8:
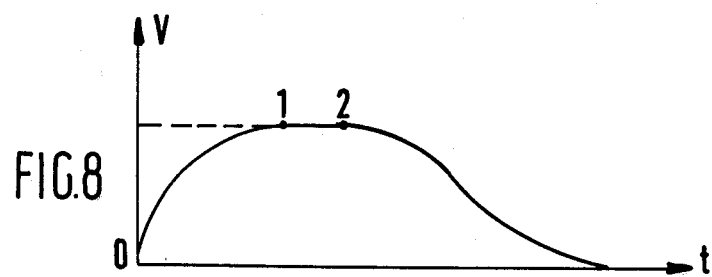
Figure 9:
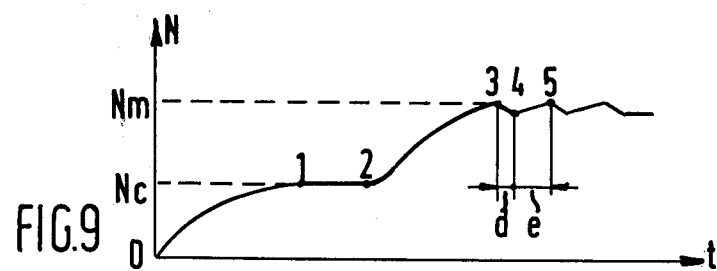
Figure 10:
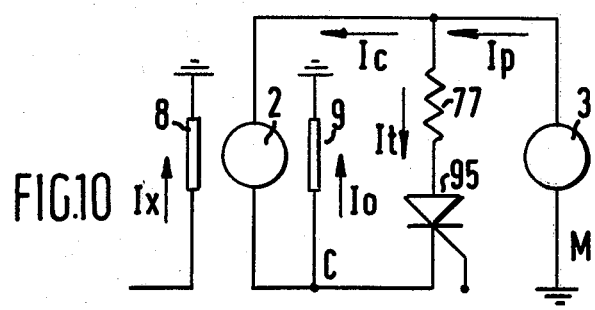
FIG. 10 shows a detail of the circuit diagram of FIG. 1 indicating the state of current flow during deceleration of the vehicle.
Figure 11:
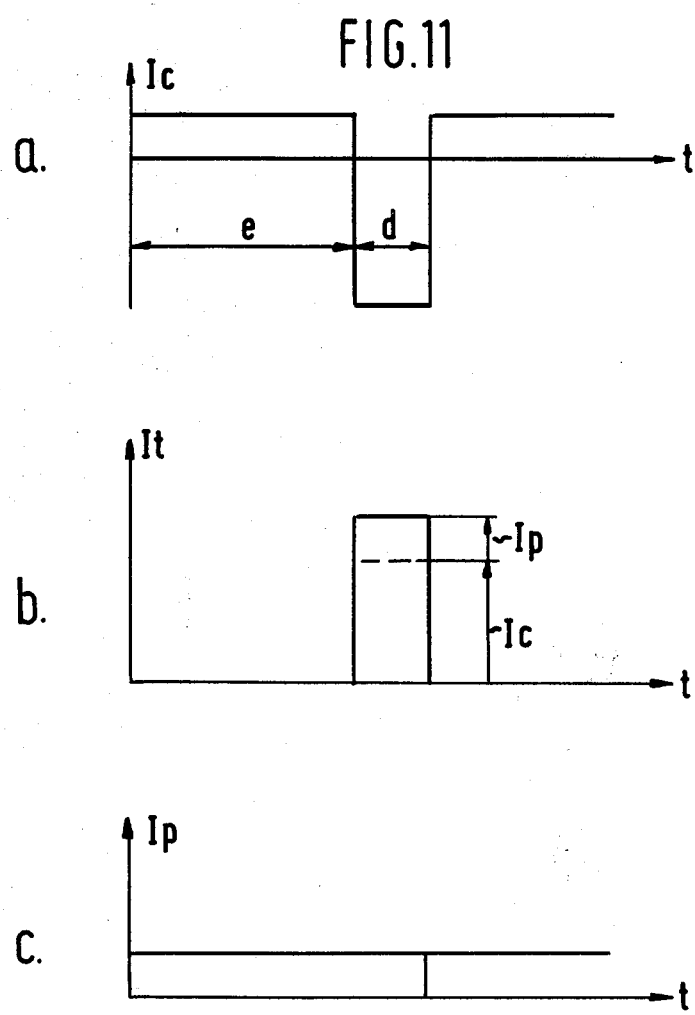
FIGS. 11(a) to 11(c) illustrate graphically the variation with time of current in various points of the circuit detail shown in FIG. 10.

FIG. 8 illustrates variations of the vehicle velocity V with time t during acceleration from rest to operation at constant speed followed by deceleration to rest. FIG. 9 illustrates corresponding variations with time t of the rotational speed N of the generator 2. It will be noted that during acceleration and operation at constant speed, the speed N of the generator 2 follows variations in the speed of the vehicle as represented by the curve 0-1-2 in each Figure. However, during subsequent deceleration of the vehicle, the speed of generator 2 increases from Nc up to a maximum Nm, represented by the curve 2-3 in FIG. 9, followed by successive minor reductions and increases in the speed N, represented by curve 3-4-5, while the vehicle finally decelerates to rest. This is achieved by automatically applying a resistive load 77 across the generator 2 whenever its speed reaches the predetermined maximum Nm, as will now be described.

A generator 4, which is coupled to the same shaft S as the generator 2 receives a substantially continuous energising current through it energising winding 12 while switches 72, 73 are closed. The output EMF of this generator 4 is stabilised to the combined voltages of the two batteries 69, 70 over a wide range of speeds by means of the Zener diode 22, diode 21, transistor 44 and the further compensating winding 11. The batteries 69, 70 are charged by the output EMF of the generator 4 via respective diodes 19, 20. When the speed of rotation of the generator 2 and hence of generator 4, reaches the said predetermined maximum Nm, the potential on the collector of the transistor 44 which has hitherto been negative, becomes positive, causing transistor 55 and 56 to conduct via resistor 91. This in turn causes transistor 57 to conduct via resistor 92 and the capacitor 62 is negatively charged on the side closer to the transistor 57. As the potential on the collector of transistor 44 continues to rise, diodes 33 and 34, which have cranked or step-function characteristics, become conductive causing transistors 53, 54 to conduct and firing the gate of a thyristor 95 connected in series with the load resistor 77 across the generator 2. This resistive loading of the generator 2 reduces the rotational speed thereof as indicated by the curve 3-4 in FIG. 9. When the speed of the generator 2 has fallen by a predetermined amount causing the transistor 57 to switch off, the capacitor 62 starts discharging through the base of transistor 58 and the resistor 93 causing transistor 58 and 59 to conduct. The resultant positive potential applied to the gates of transistor 42, 43 will cause the energising current for the winding 10 of the motor 3 to cut off in a very short period of time (typically less than 50 ms). This will tend to produce a negative output EMF from the motor 3 which is prevented by a diode 25 so that the EMF from the motor 3 falls off very fast, either to zero or to a very small value, rendering thyristor 95 non-conductive. With the resistor load 77 removed, the generator 2 will again speed up as represented by curve 4-5 in FIG. 9 until it reaches a value Nm whereupon the above cycle will be repeated. This process of cutting in and cutting out the resistor 77 is continued until the vehicle comes to a halt, and the current generated by the motor 3 remains substantially constant as will now be explained with reference to FIGS. 10 and 11a, 11b and 11c.

Figure 3:
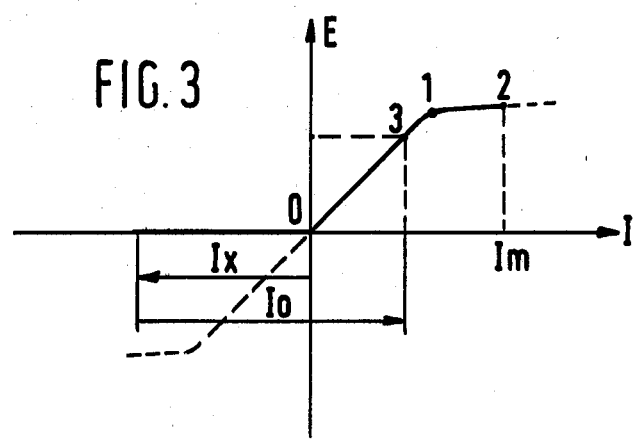

During braking, a positive energising current Ix is applied through the energising winding 8 at the generator 2 which in turn is associated with a current Io which flows through the protective winding 9. The net effect of these currents Ix, Io on the current E of the generator 2 are shown in FIG. 3, i.e. the operation of the generator 2 is represented by a point 3 on the FIG. 3 curve. During the interval e represented by the curve 4-5 in FIG. 9 when the thyristor 95 is non-conducting, the current Ic flowing through the generator 2 (shown in FIG. 11a) is equal to the current Ip (FIG. 11c) flowing through motor 3 and the generator winding 9, and this current determines the EMF of the generator 2 and vice versa. During the interval d represented by the curve 3-4 in FIG. 9 when the thyristor 95 is conducting and the resistor 77 is switched in, the current Ic (FIG. 11b) flowing through this resistor 77 is far greater than the current Ip generated by the motor 3 during braking even when the latter is at its maximum value. Since the current Io flowing through the protective winding 9 must remain constant, the current Ic through the generator 2 changes sign, and its value concentrates the value of the current It, i.e. its value becomes equal to Ip-It, so that the current Ip produced by the motor 3 remains constant regardless of whether the resistor 77 is switched in or cut out and depends exclusively upon the initial value of the energising current Ix.

When the vehicle is brought to a halt and the electric motor 3 has also stopped (i.e. Ip=0), then the EMF produced by the still rotating generator 2 would have a tendency to increase towards a negative value, as shown by the broken line in FIG. 3. However, this tendency is inhibited by a diode 18 connected to sense the output EMF of the generator 2 and operative to render transistors 40, 41 conductive and thereby cut off the positive energising current for the generators 1 and 2 by acting on the base of the transistor 38. Thus, the generator 2 produces only a negligible negative EMF-very near zero as illustrated in FIG. 3 while the vehicle remains at rest.

The circuit also includes means for determining, in dependence upon both the energy stored in the rotation of the flywheel and the EMF produced by the motor 3 and/or the generator 2, whether or not the engine should be cut in (to positively drive the generator 1 at above minimum engine speed) or cut out (blocked to its minimum or idling speed).

Referring again to FIG. 1, the base of a transistor 52 is connected to sense, via a resistor 90, the output EMF produced by generator 2 or motor 3. The collector of the transistor 52 is connected to the positive source (battery 70) via a resistor 89. As the EMF on the base of transistor 57 falls, the voltage on the collector falls and this voltage is fed via a resistor 88 to the base of a transistor 50 and resistor 87. At the same time the potential from the collector of transistor 44, which is dependent upon the speed of rotation of the generator 2 and hence on the energy stored in the flywheel (which may simply comprise the rotor of the generator 2), is also applied to the base of transistor 50 via resistor 86.

The conductivity of transistor 50 is thus dependent upon the joint action of the abovementioned two potentials. If transistor 50 becomes conductive, transistor 49 also conducts and transistor 47 becomes non-conductive causing the engine to be blocked at its idling speed. This occurs when there is sufficient energy accumulated in the flywheel as indicated by the potential of the collector of transistor 44 being insufficiently negative in combination with the potential on the collector of transistor 52 being sufficiently positive to cause transistor 50 to conduct. This may typically occur when the vehicle is stationary and the flywheel is rotating at a certain speed. If the vehicle then moves off from a stationary position, or if it is accelerated when already moving, the negative energising current applied in common to the windings 6, 8 of generators 1, 2 respectively, as a result of the change in inductivity of the winding 64, would induce a substantially larger EMF on generator 2 in relation to that on generator 1 and this would keep the diode non-conducting. This situation would prevail i.e. the motor 3 being driven by the energy produced by generator 2 until the energy accumulated in the flywheel becomes sufficiently exhausted as indicated by the potential on the collector of transistor 46 being sufficiently negative in combination with the potential on the collector of transistor 52 being insufficiently positive to sustain the conductivity of transistor 50. On transistor 50 becoming non-conductive, the transistor 47 becomes conductive and the engine speed is once again controlled by the engine power output regulating circuit comprising the generator 5, diodes 24, 28, 29, 30, transistors 45, 46, 51, and resistors 76, 81, 84, 85, described earlier.

The operations of this circuit will now be described. While the power output of the engine increases proportionately with its speed, the increase in the power output of the motor 3 is non-linear and is dependent upon the transmission of the engine power output P, as respresented by the curve in FIG. 7 where P is plotted as a function of the vehicles speed. For this reason the speed of the engine must always be slightly larger than the corresponding speed of the electric motor 3.

Figure 5:
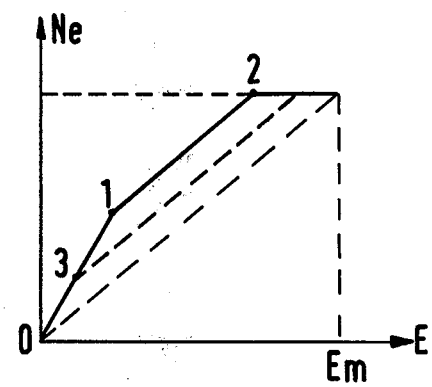

As already mentioned, the speed of the engine is controlled, inter alia, by the potential of the emitter of transistor 45, or in other words by the potential in the voltage distributor comprising the resistors 76, 84 and the transistor 51. When the generator 1 first operates, the negative potential at point A is applied to the base of transistor 51 via diode 24 so that transistor 51 is non-conductive. The EMF E of generator 1 then increases with the engine speed Ne, as represented by the line 0-3-1 in FIG. 5. When the voltage at circuit point A reaches a certain level, at which transistor 51 becomes conductive, then the voltage increase from the generator 1 with increasing engine speed follows the line 1-2 of FIG. 5. The curve 0-3-1-2 of FIG. 5 represents the variation of generator output E with engine speed for maximum generator current. In practice, the smaller currents generated, due to the protective effect of winding 7, would be represented by the broken line originating at point 3. The diodes 26 and 27 serve to limit the maximum engine r.p.m. This characteristic corresponds to the engine power output and motor 3 power output curve shown in FIG. 7.

Referring again to FIG. 1, the capacitor 99 detects, via a diode 102, negative potential from the output of the oscillator 63 during normal operation thereof, and this blocks the transistors 97, 98 via a resistor 101. However, if the oscillator 63 fails to function owing to a fault or the like, the negative charge on the capacitor 99 discharges, permitting the transistors 97, 98 to be rendered conductive via resistor 100 and to apply a positive potential to the bases of transistors 38, 39. Consequently, the vehicle cannot be moved if already stationary, or it will come to a halt if already moving. Furthermore, if the positive feed is interrupted while the vehicle is being driven, the electromagnetic clutch will engage only if the vehicle is decelerating, i.e. when the energising potential from the emitters of transistors 38, 39 is not negative such as to cause diode 23 to conduct. While the vehicle is under power, the winding 68 is energised via the diode 23 by the negative energising current and so the clutch remains disengaged.

It will be noted that diodes 16, 17, 29, 31, 32, 35, 36 are protective diodes. Further, should there be a failure of the triggering circuit for the thyristor 95, which includes, for example, transistors 53, 54, such that the thyristor remains non-conducting, then as the voltage at the collector of transistor 44 continues to increase as the speed of the flywheel increases, then a diode 37 will become conductive, switching on transistors 60, 61 and firing the thyristor which will then remain on until the vehicle comes to a halt.

In the appended claims reference numbers have been used purely by way of illustration and not of limitation.

I claim:

1. A control system for an electrically driven vehicle, comprising a prime mover for driving first generator means (1), electric traction motor means (3) for converting electrical energy generated by the first generator means (1) into mechanical energy propelling the vehicle, second generator means (3) operative during deceleration of the vehicle to convert kinetic energy of the vehicle into electrical energy, second motor means (2) for converting electrical energy generated by the second generator means during said deceleration into mechanical energy stored in mechanical energy accumulator means, and third generator means (2) operative during subsequent acceleration of the vehicle to convert mechanical energy stored in the mechanical energy accumulator means into electrical energy for driving the electric traction motor means (3).

2. A control system as claimed in claim 1, wherein the traction motor means and the second generator means comprise a common first induction motor/generator (3) the second motor means and the third generator means comprise a common second induction motor/generator (2), and the first generator means comprises an induction generator (1).

3. A control system as claimed in claim 2, wherein the energising or field windings (6,8) of the first generator means and the second induction motor/generator (2) are connected to receive a common energising current, and the respective functions thereof during acceleration and braking of the vehicle are determined by varying said energising current the direction of the said energising current being alternately reversed by successive operations of the acceleration and braking control of the vehicle.

4. A control system as claimed in claim 2 wherein the induction windings of the first generator means (1) and the first and second induction motor/generates (3,2) are connected together in parallel.

5. A control system as claimed in claim 4, including diode or rectifier means connected between the induction winding of the first generator (1) and those of the first and second motor/generators (3,2) to prevent the reverse flow of current produced by the first and second generator means when operating in their respective generator modes.

6. A control system as claimed in claim 2 wherein the first generator means (1) and the second motor/generator (2) each include protective field windings (7,9) connected to reduce the strength of the magnetic field produced by the field winding by an amount proportioned to the current flowing through the induction winding thereof, each said protective field winding (7,9) being connected in series with the associated induction winding.

7. A control system as claimed in claim 2 wherein the field winding (10) of first motor/generator (3) is supplied by a voltage controlled by the magnitude of the EMF in the induction winding thereof thereby to reduce the strength of the magnetic field produced thereby in dependence upon EMF in the induction winding.

8. A control system as claimed in claim 2 wherein the polarity of the voltage applied to the field winding (10) of the first motor/generator (3) is reversible whereby to control the direction of movement of the vehicle.

9. A control system as claimed in claim 1 including control means (66) for controlling the speed of the prime mover in accordance with the vehicle acceleration required, the system including means for overriding said control means in dependence upon the amount of energy stored in the mechanical energy accumulator means and the EMF generated by the third generator means (2), said control means (66) being responsive to the magnitude and polarity of the energising current applied to the first generator means (1), and to a feedback signal dependent upon the speed of the prime mover and to a signal dependent upon the EMF generated by the first generator means (1).

10. A control system as claimed in claim 1 wherein the mechanical energy accumulator means comprises a flywheel coupled to or comprising the common rotor of the second motor means (2) and the third generator means (2); and wherein means responsive to the speed of the flywheel to apply a resistive load are connected in parallel with the second motor means (2) whenever the speed thereof exceeds a predetermined value whereby to limit the maximum speed of the flywheel without affecting the current generated by the traction motor means (3) during deceleration of the vehicle.

* * * * *